July 23, 1963 F. P. GORMAN 3,098,539
AERIAL HARNESS
Filed Nov. 13, 1961

INVENTOR.
FRANCIS P. GORMAN
BY
Beehler & Shanahan
ATTORNEYS.

United States Patent Office 3,098,539
Patented July 23, 1963

3,098,539
AERIAL HARNESS
Francis P. Gorman, 1332 Franklin St., Apt. A,
Santa Monica, Calif.
Filed Nov. 13, 1961, Ser. No. 151,696
4 Claims. (Cl. 182—3)

This invention relates to an aerial harness adapted for occupant actuation.

The harness of this invention is of the type designed for use by a single workman, e.g., painter, window washer and construction worker, for suspension on the outside of a building or other structure, and includes block and tackle means by which the workman may hoist and lower himself.

It is an object of this invention to provide an improved aerial harness of the above-mentioned character and which prevents undesired rotation of the occupant when suspended.

A general object is to provide an aerial harness which is rugged in construction, safe and reliable in service, easy to operate, and simple and economical to manufacture.

Further objects and advantages of the invention will appear in the following part of this description wherein the details of construction and mode of operation of a preferred embodiment are described with reference to the accompanying drawing, in which.

Figures 1, 2, 3:
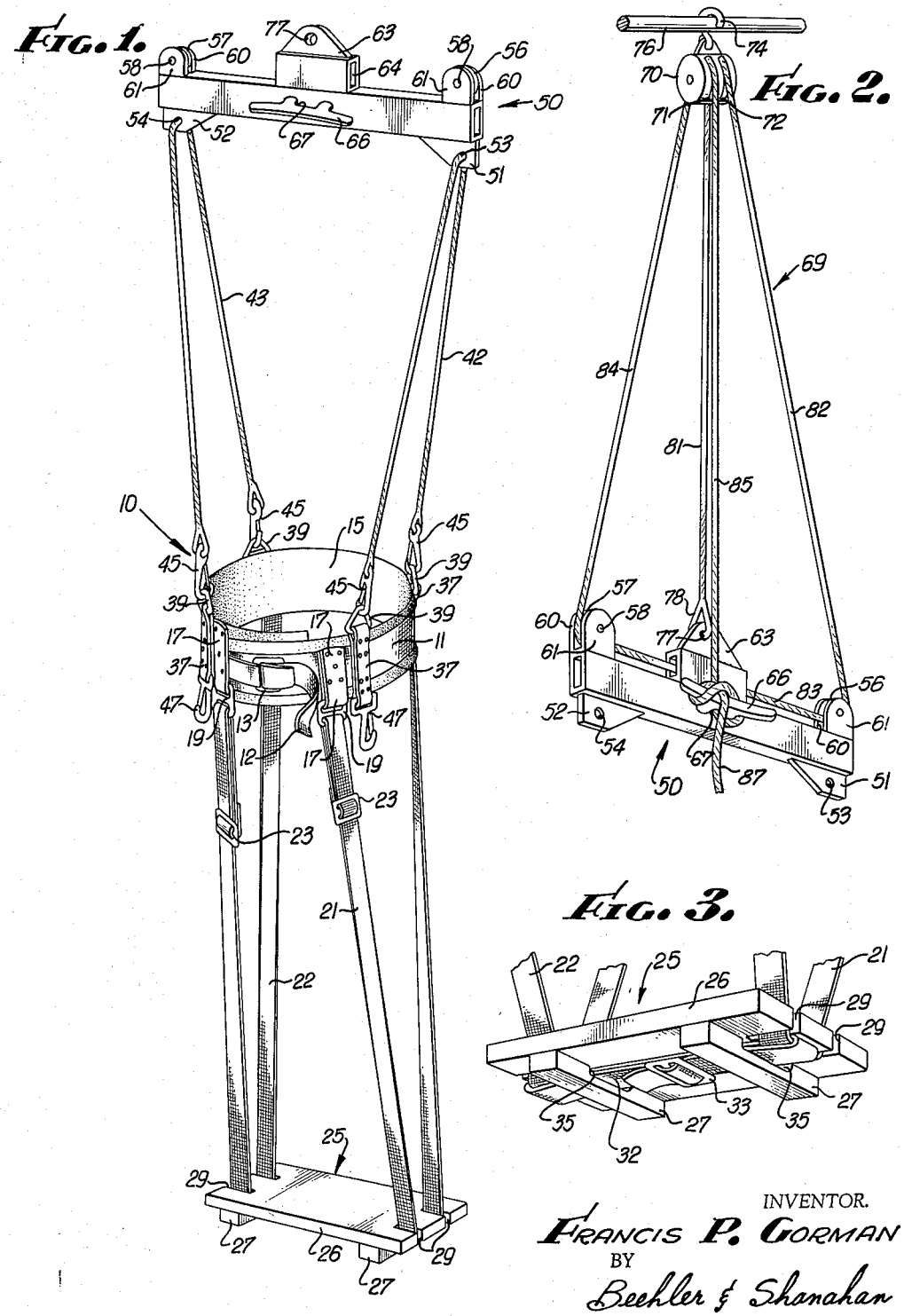
FIG. 1 is a perspective view of the beam, safety belt, sling, and seat parts of an aerial harness of this invention.
FIG. 2 is a perspective view of the block and tackle and beam parts of the harness; and, FIG. 3 is a perspective view showing the underside of the seat of the harness on an enlarged scale.

Referring to the drawing in greater detail, the illustrated embodiment of an aerial harness of this invention comprises a safety belt which is designated generally by reference numeral 10, and is adapted to be fastened around the waist of an occupant of the harness. Belt 10 is formed of a band 11, preferably of leather or plastic, and has a strap 12 secured at one end of the band and a buckle 13 secured at the other end for tightening the belt around the occupant's waist. Lining the inside of the band is a cushion 15 of felt or other suitably soft fabric.

There are four loops 17 riveted or otherwise suitably secured to the outside of the band 11, the loops being spaced apart circumferentially of the band. Each loop 17 has a strap connector 19 for securing two slings 21 and 22 to the belt. Each sling has a buckle 23 for adjusting its length. The slings suspend a seat from the belt, the seat being designated generally by reference numeral 25.

Seat 25 comprises a platform or flat board 26 and two strengtheners 27 on the underside of the board. At each end of the board 26 are two slits 29 for receiving the looped ends of the slings 21 and 22. Sling 21 passes through one slit 29 at one end of the seat, thence along the underside of the seat and to and through the other slit of the pair of slits at one end of the seat, while sling 22 passes likewise through the pair of slits 29 at the other end of the seat. The slings are prevented from sliding out from their respective pairs of slits 29 by a strap 32 on the underside of the seat. Strap 32 has a buckle 33 for adjustment of its length, the strap 32 passing longitudinally of the underside of the seat through slots 35 formed in the seat strengtheners 27, and being looped around each of the slings 21 and 22. The slings may be lengthened as desired by adjustment of their buckles 23 to the length illustrated in the drawing for permitting the occupant to stand on the seat, and the slings may be shortened to an appropriate length for permitting the occupant to sit on the seat.

The illustrated aerial harness includes four additional loops 37 riveted or otherwise suitably secured to the outside of the band 11 of the safety belt and adjacent the loops 17 respectively. Each such loop 37 has a ring 39, of triangular configuration in the illustrated embodiment, for attaching ropes or straps 42 and 43 to the belt. The straps have at each end a safety hook 45 for connection of the ends of the straps to the four triangular rings 39 respectively, whereby the safety belt 10 is suspended by the straps 42 and 43. At the lower end of each loop 37 is another safety hook 47 for convenience to the occupant in hanging tools or materials from the belt. The hooks 47 also serve, if desired, to hang the seat 25 from the belt with appropriately short slings.

Spaced above the belt 10, is a rigid beam 50 of a length of about three feet. At its ends and on its underside are lugs 51 and 52 with apertures 53 and 54 respectively, through which the tie ropes 42 and 43 pass. On the upper side of the beam and positioned at the ends respectively of the beam are two pulleys 56 and 57, each having its axle 58 extending in a direction transversely of the beam between two mounting lugs 60 and 61. Intermediate the ends of the beam is an anchoring member 63 having a passage 64 extending therethrough longitudinally of the beam. From one side of the beam there extends a cleat 66 having an opening 67. Lugs 51, 52, 60, and 61, cleat 66, and anchoring member 63 are made integral with the body of the beam as by welding.

The beam 50 is adapted to be hung from a double pulley block 70 by a rope 69. The double pulley block contains two sheaves 71 and 72. The block has a hook 74 by which the block is attached to a support means 76 projecting outwardly from the building or other structure from which the aerial harness is to be suspended. It will be noted that the hook 74 prevents the pulley block 70 from rotation of the block on its vertical axis.

One end of the rope 69 is tied to the anchoring piece 63 of the horizontal beam 50, this securement of the end of the rope being preferably done as shown in the drawing by passing the end of the rope through an aperture 77 in the anchoring piece forming a loop 78 in the end of the rope which is spliced or otherwise suitably closed. From the anchor piece on the beam, the rope 69 passes as one tackle cord 81 through the pulley block 70 being reeved over the sheave 72 of the pulley block. The rope then leads from sheave 72 as cord 82 to the pulley 56. From the beam pulley 56 the rope passes as length 83 through the passage 64 of the anchor piece 63 to the pulley 57 at the other end of the beam. From around the pulley 57 the rope extends through a length 84 back again to the double pulley block 70 where it is reeved around the other sheave, 71, of the pulley block, and thence down in length 85 through the opening 67 of the cleat 66. The free length 87 of the rope is handy to be grasped by the occupant of the harness to raise or lower the harness as desired. When the harness is at a desired position of elevation with respect to the support 76, the end portion 87 of the rope is wrapped around the arms of the cleat 66 to secure the rope to the beam.

It will be noted that the tackle arrangement of the aerial harness of this invention is such that the ratio of weight lifted or the force or pull to be exerted on the length 87 of the rope by the occupant is only ⅓ his weight, including, of course, the weight of the harness. Furthermore, the arrangement of the rope 69 and the double pulley block 70 and the horizontal beam 50 as provided by this invention is such that the harness if prevented from rotating on its vertical axis thereby to steady the occupant at whatever position of elevation he has raised or lowered himself.

While this invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having thus described my invention, what is claimed as new in support of Letters Patent is:

1. An aerial harness for a single occupant comprising a belt having adjustable means for fastening the belt around the waist of the occupant, a beam adapted to extend horizontally spaced above the belt, tie means for suspending the belt from the ends of the beam, two pulleys on the ends respectively of the beam with their axes being transverse with respect to the longitudinal axis of the beam, the beam having an anchor piece and a cleat intermediate its ends, a double pulley block adapted to be secured in a position against rotation of the block on its vertical axis and with the axis of its sheaves extending horizontally, a rope secured at one end thereof to said anchor piece, and the rope passing from its secured end through said block over one sheave, thence reeved on one of said beam pulleys, thence passing through said anchor piece and reeved on the other of said beam pulleys, thence reeved on the other sheave of said block, and thence passing to said cleat for actuation by said occupant.

2. An aerial harness according to claim 1, in which said tie means comprises four cord lengths releasably secured at four places respectively to the belt, said securement places being spaced substantially uniformly around the belt, two of said cord lengths extending to one end of the beam, and the other two cord lengths extending to the other end of the beam.

3. An aerial harness for a single occupant comprising a belt having adjustable means for fastening the belt around the waist of the occupant, a pair of slings hanging from the belt, a seat hung by said slings for supporting the occupant, a beam adapted to extend horizontally spaced above the belt, tie means for suspending the belt from the ends of the beam, two pulleys on the ends respectively of the beam with their axes being transverse with respect to the longitudinal axis of the beam, the beam having a cleat intermediate its ends for releasably securing a rope to the beam, a double pulley block adapted to be secured in a position against rotation of the block on its vertical axis and with the axis of its sheaves extending horizontally, a rope secured at one end thereof to the beam intermediate the ends of the beam, the rope passing from its secured end through said block over one sheave, thence reeved on said pulleys on the beam, thence reeved on the other sheave of said block, and thence passing to said cleat for actuation by said occupant.

4. An aerial harness according to claim 3 in which said seat comprises a platform, each end of the platform having two slits for receiving a sling to pass from one slit and thence under the platform and to and through the other slit, and a strap of adjustable length tying the slings to each other on the underside of the platform.

References Cited in the file of this patent
UNITED STATES PATENTS

| 1,875,807 | Gorman | Sept. 6, 1932 |
| 2,312,583 | Penlon | Mar. 2, 1943 |